United States Patent [19]

Sielagoski et al.

[11] Patent Number: 6,161,074

[45] Date of Patent: Dec. 12, 2000

[54] METHOD AND SYSTEM FOR CONTINUED VEHICLE CONTROL IN AN ADAPTIVE SPEED CONTROL SYSTEM AT VEHICLE SPEEDS BELOW A MINIMUM OPERATING SPEED WHEN A SENSED TARGET DISAPPEARS

[75] Inventors: Gerald L. Sielagoski, St. Clair Shores; Mark Peter Friedrich, Clinton Township; Sam G. Rahaim, Ann Arbor, all of Mich.

[73] Assignee: Visteon Global Technologies, Inc., Dearborn, Mich.

[21] Appl. No.: 09/470,379

[22] Filed: Dec. 22, 1999

[51] Int. Cl.[7] ............................................. B60T 7/12
[52] U.S. Cl. .................. 701/96; 701/93; 701/70; 701/79; 701/301; 180/167; 180/168; 180/170; 340/903; 340/435; 340/436; 342/70; 342/71; 342/109
[58] Field of Search ........................... 701/96, 301, 302, 701/1, 22, 23, 70, 78, 79, 93; 180/167, 168, 170; 342/61, 70, 71, 109; 340/903, 435, 436

[56] References Cited

U.S. PATENT DOCUMENTS 5,493,302  2/1996  Woll et al. ............................. 342/71
5,678,650  10/1997  Ishihara et al. ........................ 180/169

*Primary Examiner*—William A. Cuchlinski, Jr.
*Assistant Examiner*—Yonel Beaulieu
*Attorney, Agent, or Firm*—Mark L. Mollon

[57] ABSTRACT

In an adaptive speed control system for a vehicle, a method and system for continued vehicle braking at a vehicle speed below a minimum operating speed threshold when a sensed target disappears. The method and system determine whether the vehicle speed is less than the minimum operating speed threshold, determine whether a sensed target has disappeared if the vehicle speed is less than the minimum operating speed threshold, and generate a phantom target having a range and range rate corresponding to a last known range and range rate, respectively, of the sensed target if the sensed target has disappeared. The method and system also control the vehicle speed based on the range and range rate of the phantom target.

20 Claims, 2 Drawing Sheets

METHOD AND SYSTEM FOR CONTINUED VEHICLE CONTROL IN AN ADAPTIVE SPEED CONTROL SYSTEM AT VEHICLE SPEEDS BELOW A MINIMUM OPERATING SPEED WHEN A SENSED TARGET DISAPPEARS

TECHNICAL FIELD

This invention relates to a method and system for continued vehicle control in an adaptive speed control system at a vehicle speed below a minimum operating speed threshold when a sensed target disappears, based on a phantom target generated to compensate for the loss of the sensed target.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path vehicle. Using the range and range rate, the speed of the ACC equipped vehicle is controlled to maintain a selected following interval between the ACC equipped vehicle and the sensed in-path vehicle. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

When maintaining the selected following interval, however, existing ACC methods and systems may decelerate the ACC equipped vehicle to a speed less than a minimum operating speed threshold. In such situations, the ACC system is simply deactivated. This is typically accomplished by "fading" the vehicle brakes. That is, the vehicle brake actuators are controlled to gradually decrease to zero the hydraulic pressure applied to the vehicle brakes. Thereafter, the ACC system having been deactivated, absent intervention by the vehicle operator, the vehicle simply coasts.

Thus, in an ACC system, there exists a need for a method and system for continued control of an ACC equipped vehicle when the speed of the vehicle decreases below the minimum operating speed threshold and a sensed target disappears. Such a method and system would add to an ACC equipped vehicle the ability to control the vehicle speed based on a phantom target. More specifically, when maintaining the selected following interval, if the speed of the ACC equipped vehicle decreases below the minimum operating speed threshold, such a method and system would determine whether the sensed in-path target vehicle has disappeared (such as where the sensed target leaves the path of the ACC equipped vehicle, the ACC equipped vehicle leaves the path of the sensed target, or the sensed target reaches a sufficiently low speed that it can no longer be identified). In that event, such a method and system would compensate for the loss of the sensed target by controlling the speed of the ACC equipped vehicle based on the range and range rate of a phantom target. Such a phantom target would be created from the last known range and range rate of the sensed target that has disappeared from the radar tracking files of the ACC system. Below the minimum operating speed threshold, such a method and system could thereby allow, for example, the ACC equipped vehicle to maintain braking even if the in-path sensed vehicle has disappeared. In so doing, such a method and system would provide the ACC equipped vehicle with a smoother, more comfortable response.

DISCLOSURE OF INVENTION

Accordingly, it is a principal object of the present invention to provide, in an adaptive speed control system for a vehicle, a method and system for continued vehicle control at a vehicle speed below a minimum operating speed threshold when a sensed target disappears, based on a phantom target created to compensate for the loss of the sensed target.

According to the present invention, then, in an adaptive speed control system for a vehicle, a method and system are provided for continued vehicle control at a vehicle speed below a minimum operating speed threshold when a sensed target disappears. The method comprises determining whether the vehicle speed is less than the minimum operation speed threshold, determining whether a sensed target has disappeared if the vehicle speed is less than the minimum operating speed, and generating a phantom target having a range and range rate corresponding to a last known range and range rate, respectively, of the sensed target if the sensed target has disappeared. The method further comprises controlling the vehicle speed based on the range and range rate of the phantom target.

The system of the present invention includes a receiver capable of receiving an input signal indicative of the vehicle speed, and a controller capable of determining whether the vehicle speed is less than the minimum operating speed threshold, capable of determining whether a sensed target has disappeared if the vehicle speed is less than the minimum operating speed threshold, and capable of generating a phantom target having a range and range rate corresponding to a last known range and range rate, respectively, of the sensed target if the sensed target has disappeared. The controller of the system of the present invention is further capable of controlling the vehicle speed based on the range and range rate of the phantom target.

These and other objects, features and advantages of the present invention will be readily apparent upon consideration of the following detailed description of the invention in conjunction with the accompanying drawings.

BEST MODE FOR CARRYING OUT THE INVENTION

Figure 1:
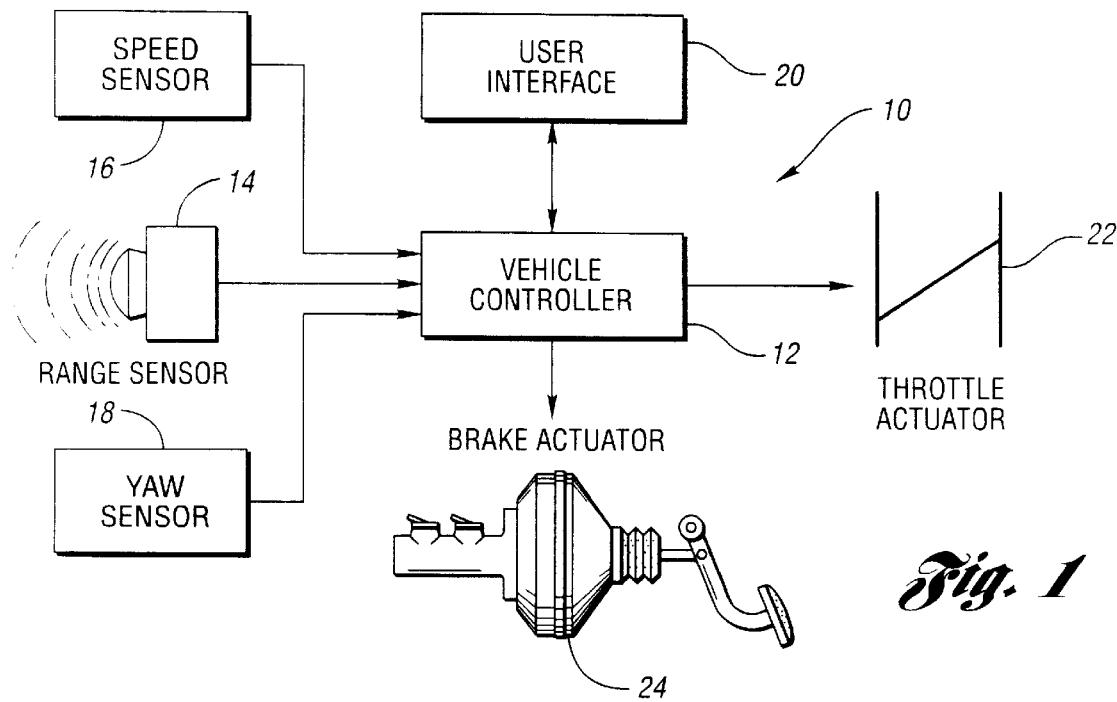
FIG. 1 is a simplified block diagram of an adaptive cruise control system, including the system of the present invention.
Figures 2A, 2B:
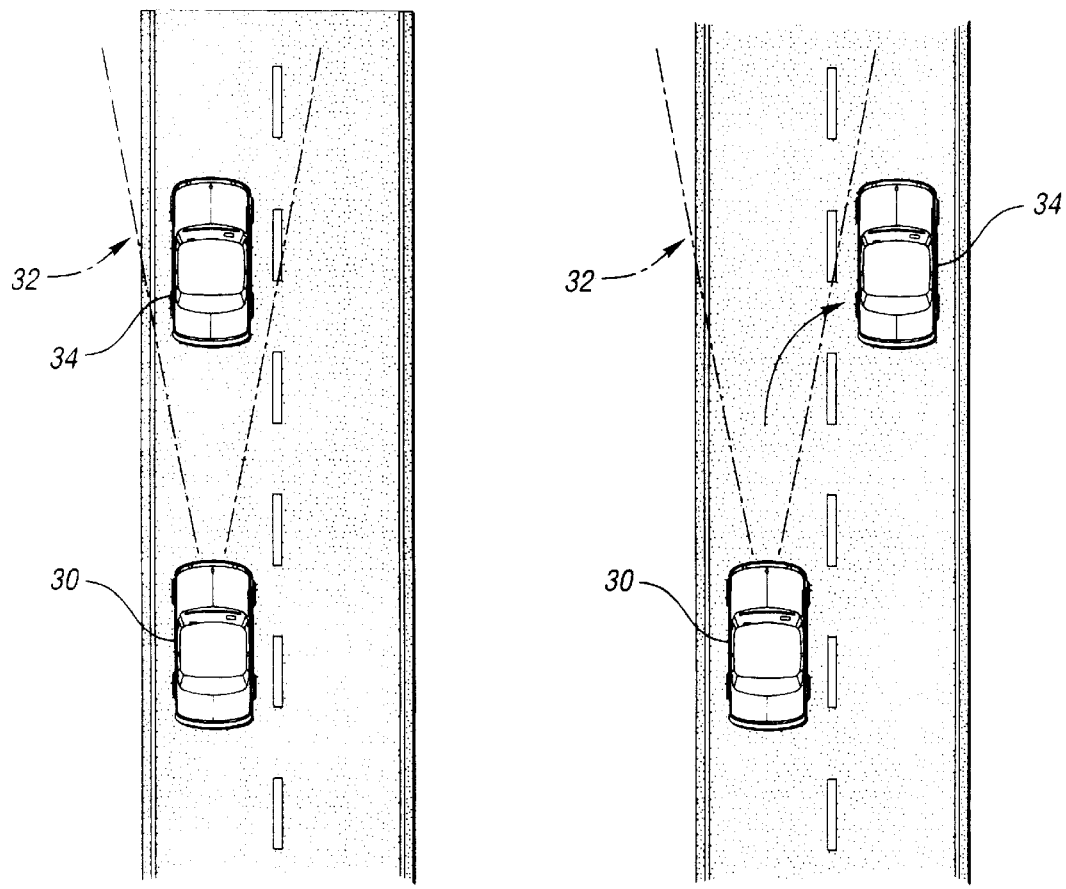
FIGS. 2a and 2b are diagrams depicting an example of a sensed in-path vehicle and the disappearance thereof in an adaptive cruise control system.
Figure 3:
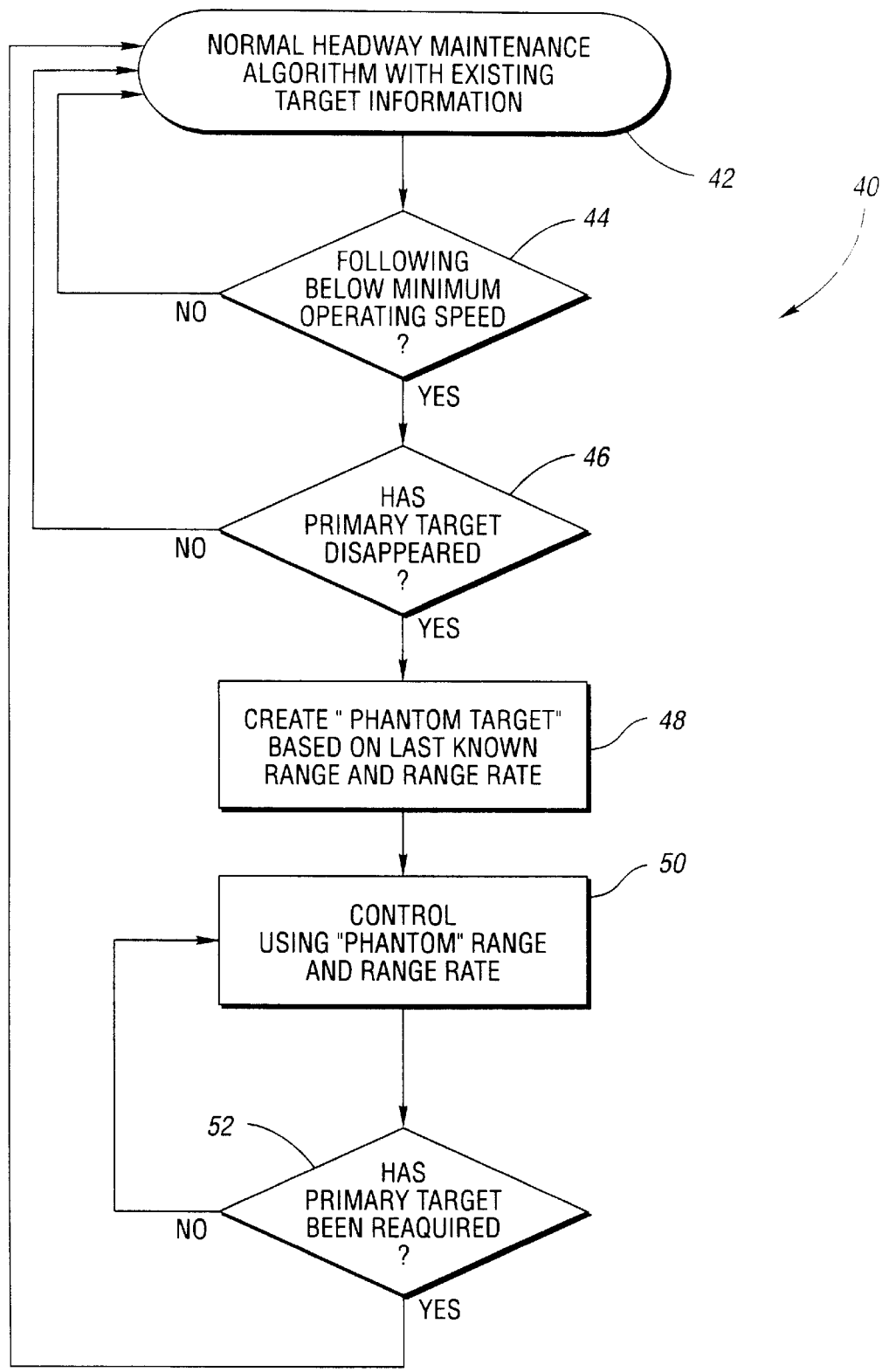
FIG. 3 is a flowchart including the method of the present invention.

Referring to FIGS. 1–3, the preferred embodiment of the method and system of the present invention will now be described. In that regard, FIG. 1 illustrates a simplified block diagram of an Adaptive Cruise Control (ACC) system, including the system of the present invention, denoted generally by reference numeral 10.

In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 1, the ACC system (10) includes a vehicle controller (12) provided in communication with a range sensor (14), a speed sensor (16), a yaw rate sensor (18), a user interface (20), a throttle actuator (22), and a brake actuator (24). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target in the forward path of travel of the ACC equipped vehicle (i.e., a lead vehicle).

The following interval between the ACC equipped vehicle and the sensed target is initially set at a default value (typically two seconds) upon activation of the system (10), but may be modified by the vehicle operator to any of a number of other selectable values via user interface (20). The default following interval is typically the maximum following interval allowed, and modification of the following interval by the vehicle operator is permitted between that maximum and a defined minimum following interval. The following interval is referred to as headway, and is defined as the range to the sensed target (in meters), divided by the speed of the ACC equipped vehicle (in meters per second). User interface (20) is also used by the vehicle operator to set the desired vehicle control speed.

As previously noted, ACC systems and methods are well known in the art. As a result, a detailed description of the general operation of ACC system (10), including such functions as acquisition, discrimination, differentiation, selection and tracking of targets, range and relative velocity (range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

As also previously noted, while maintaining the selected following interval, existing ACC methods and systems may decelerate the ACC equipped to a speed less than a minimum operating speed threshold. In such situations, the ACC system is simply deactivated. This is typically accomplished by "fading" the vehicle brakes. That is, the vehicle brake actuators are controlled to gradually decrease to zero the hydraulic pressure applied to the vehicle brakes. Thereafter, the ACC system having been de-activated, absent intervention by the vehicle operator, the vehicle simply coasts.

In contrast, the present invention provides, in an ACC system, a method and system for continued control of an ACC equipped vehicle when the speed of the vehicle decreases below the minimum operating speed threshold and the sensed target disappears. In that regard, the present invention adds to an ACC equipped vehicle the ability to control the vehicle speed based on a phantom target. More specifically, when maintaining the selected following interval, if the speed of the ACC equipped vehicle decreases below the minimum operating speed threshold, the present invention determines whether the sensed in-path target vehicle has disappeared (such as where the sensed target leaves the path of the ACC equipped vehicle, the ACC equipped vehicle leaves the path of the sensed target, or the sensed target reaches a sufficiently low speed that it can no longer be identified). If so, the present invention compensates for the loss of the sensed target by controlling the speed of the ACC equipped vehicle based on the range and range rate of a phantom target. The phantom target is created from the last known range and rage rate of the sensed target that has disappeared from the radar tracking files of the ACC system. Below the minimum operating speed threshold, the present invention could allow, for example, the ACC equipped vehicle to maintain braking even if the in-path sensed vehicle has disappeared. In so doing, the present invention provides the ACC equipped vehicle with a smoother, more comfortable response.

In that regard, an example of a sensed in-path vehicle and the disappearance thereof is depicted in FIGS. 2a and 2b. As seen in FIG. 2a, ACC equipped vehicle (30) uses radar pattern (32) of an ACC range sensor (not shown) to identify lead vehicle (34) as a sensed target. If necessary, ACC equipped vehicle (30) automatically decelerates to maintain a selected headway setting. Such deceleration may result in the speed of ACC equipped vehicle (30) decreasing below a minimum operating threshold speed. As previously noted, in that event, the ACC system is simply deactivated, which is typically accomplished by "fading" the vehicle brakes. That is, the vehicle brake actuators are controlled to gradually decrease to zero the hydraulic pressure applied to the vehicle brakes.

As previously noted, the present invention provides, in the ACC system (10) of FIG. 1, a method and system for continued braking of the ACC equipped vehicle when the vehicle speed falls below the minimum operation speed and the sensed target disappears. More specifically, in the event the vehicle speed is less than the minimum operating speed, the method and system first determine whether the sensed target has disappeared. In that regard, referring to FIG. 2b, it can be seen that lead vehicle (34) has changed lanes, thereby disappearing from radar pattern (32) of ACC equipped vehicle (30). A sensed target may also disappear when, for example, lead vehicle (34) continues in its present lane and ACC equipped vehicle (30) changes lanes (not shown). Still further, a sensed target may also disappear if it reaches a sufficiently low speed that it can no longer be identified.

Regardless, if the sensed target disappears, the method and system of the present invention compensate for such a disappearance by generating a phantom target having its own range and range rate values. The initial values of the range and range rate of the phantom target correspond to the last known range and range rate, respectively, of the lost sensed target. Subsequent values of the range and range rate of the phantom target are extrapolated. The method and system of the present invention then control the speed of the ACC equipped vehicle based on the range and range rate of the phantom target. One type of such control may include continued braking of the ACC equipped vehicle to reduce vehicle speed, including possibly stopping the vehicle.

While the method and system control the speed of the ACC equipped vehicle based on the phantom target, the method and system also continue to determine whether a sensed target has been reacquired. If a sensed target is not reacquired, the method and system continue to control the speed of the ACC equipped vehicle based on the phantom target. If, however, a sensed target is reacquired, the method and system of the present invention may then permit operation of the following mode of the ACC system (10) to resume, based on the target information (including range and range rate) of the newly acquired primary target. Such a resumption of following mode operation may include deactivation of the ACC system (10), particularly where the speed of the ACC equipped vehicle is less than the minimum operating speed. As in existing ACC methods and systems, such deactivation would preferably include "fading" the vehicle brakes (i.e., gradually reducing to zero the amount of hydraulic pressure applied to the vehicle brakes). Regardless, according to the present invention, an improved response of the ACC equipped vehicle is provided. By allowing, for example, the ACC equipped vehicle to continue braking even though the sensed target has disappeared, the present invention provides the ACC equipped vehicle with a smoother, more comfortable response.

Referring again to FIG. 1, the system of the present invention is preferably included in vehicle controller (12). In that regard, vehicle controller (12) includes a receiver (not shown) capable of receiving an input signal from speed sensor (16) indicative of the speed of the ACC equipped vehicle. Vehicle controller (12) also includes a controller (not shown) a controller capable of determining whether the vehicle speed is less than the minimum operating speed threshold, determining whether a sensed target has disappeared if the vehicle speed is less than the minimum operating speed threshold, generating a phantom target having a range and range rate corresponding to a last known range and range rate, respectively, of the sensed target if the sensed target has disappeared, and controlling the vehicle speed based on the range and range rate of the phantom target. In that regard, to control the vehicle speed based on the range and range rate of the phantom target, the controller may be capable of reducing the vehicle speed by generating a brake control signal operative to control a brake actuator, including reducing the vehicle speed to zero.

The controller of the system of the present invention may further capable of determining whether another sensed target has been acquired, and deactivating the adaptive speed control system if another sensed target has been acquired. In that regard, to deactivate the adaptive speed control system, the controller may be capable of generating a braking control signal operative to control a brake actuator to gradually reduce to zero an amount of hydraulic pressure applied by the brake actuator. It should be noted here that the controller of the present invention (as well as vehicle controller (12) of ACC system (10)) may take the form of an appropriately programmed microprocessor, or any equivalent thereof.

Referring now to FIG. 3, a flowchart including the method of the present invention is shown, depicted generally by reference numeral 40. As seen therein, during operation, existing ACC methods include a headway maintenance algorithm which operates based on existing target information (42), including the range and range rate of the primary target and a selected headway value. Such an algorithm has been previously described as following mode operation and, once again, is well known to those of ordinary skill in the art. According to the method of the present invention, during such operation, it is determined whether the ACC equipped vehicle is following the sensed target at a speed below the minimum operating speed threshold of the ACC system (44). If not, operation of the headway maintenance algorithm continues based on existing target information (42).

However, if the speed of the ACC equipped vehicle is less than the minimum operating speed, it is determined whether the primary target has disappeared (46). If not, operation of the headway maintenance algorithm once again continues based on existing target information (42). In that event, since the speed of the ACC equipped vehicle is less than the minimum operating speed threshold, the ACC system may be deactivated, such as by "fading" the vehicle brakes to gradually decrease the braking force applied to the vehicle.

If, however, the primary target has disappeared, the method of the present invention creates a phantom target based on the last known range and range rate of the lost sensed target (48), as described in detail above. Thereafter, according to the method of the present invention, the speed of the ACC equipped vehicle is controlled based on the phantom target, including the range and range rate of that phantom target (50), again as previously described in detail. In that regard, such control may include continued braking of the ACC equipped vehicle to reduce vehicle speed, including up to stopping the vehicle.

Subsequently, it is determined whether a primary target has been reacquired (52). If not, control of the ACC equipped vehicle speed continues based on the phantom target, including the range and range rate of that phantom target (50). In the event, however, that a primary target has been reacquired, then operation of the headway maintenance algorithm resumes (42), based on the target information of the newly acquired primary target. Once again, in that event, as the speed of the ACC equipped vehicle may be less than the minimum operating speed threshold, the ACC system may be deactivated, such as by "fading" the vehicle brakes to gradually decrease the braking force applied to the vehicle.

In view of the foregoing description, it can be seen that the present invention provides, in an adaptive speed control system for a vehicle, a method and system for continued vehicle control at vehicle speeds below a minimum operating speed threshold when a sensed target disappears. Such a method and system add to an ACC equipped vehicle the ability to control the vehicle speed based on the range and range rate of a phantom target created from the last known range and rage rate of the sensed target that has disappeared from the radar tracking files of the ACC system. Below the minimum operating speed threshold, such a method and system may allow, for example, the ACC equipped vehicle to maintain braking even if the in-path sensed vehicle has disappeared. In so doing, such a method and system provide the ACC equipped vehicle with a smoother, more comfortable response.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for continued vehicle control at a vehicle speed below a minimum operating speed threshold when a sensed target disappears, the method comprising:
   determining whether the vehicle speed is less than the minimum operating speed threshold;
   if the vehicle speed is less than the minimum operating speed threshold, determining whether a sensed target has disappeared;
   if the sensed target has disappeared, generating a phantom target having a range and range rate corresponding to a last known range and range rate, respectively, of the sensed target; and
   controlling the vehicle speed based on the range and range rate of the phantom target.

2. The method of claim 1 wherein controlling the vehicle speed based on the range and range rate of the phantom target comprises reducing the vehicle speed by generating a brake control signal operative to control a brake actuator.

3. The method of claim 2 wherein reducing the vehicle speed includes reducing the vehicle speed to zero.

4. The method of claim 1 further comprising:
   determining whether another sensed target has been acquired; and
   if another sensed target has been acquired, controlling the vehicle speed based on a range and range rate associated with the another sensed target.

5. The method of claim 4 wherein controlling the vehicle speed based on the range and range rate associated with the another sensed target includes deactivating the adaptive speed control system.

6. The method of claim 5 wherein deactivating the adaptive speed control system includes generating a braking control signal operative to control a brake actuator to gradually reduce to zero an amount of hydraulic pressure applied by the brake actuator.

7. The method of claim 2 further comprising:
   determining whether another sensed target has been acquired; and
   if another sensed target has been acquired, controlling the vehicle speed based on a range and range rate associated with the another sensed target.

8. The method of claim 7 wherein controlling the vehicle speed based on the range and range rate associated with the another sensed target includes deactivating the adaptive speed control system.

9. The method of claim 8 wherein deactivating the adaptive speed control system includes generating a braking control signal operative to control a brake actuator to gradually reduce to zero an amount of hydraulic pressure applied by the brake actuator.

10. The method of claim 3 further comprising:
    determining whether another sensed target has been acquired; and
    if another sensed target has been acquired, controlling the vehicle speed based on a range and range rate associated with the another sensed target.

11. In an adaptive speed control system for a vehicle, a system for continued vehicle control at a vehicle speed below a minimum operating speed threshold when a sensed target disappears comprising:
    a receiver for receiving an input signal indicative of the vehicle speed; and
    a controller for determining whether the vehicle speed is less than the minimum operating speed threshold, determining whether a sensed target has disappeared if the vehicle speed is less than the minimum operating speed threshold, generating a phantom target having a range and range rate corresponding to a last known range and range rate, respectively, of the sensed target if the sensed target has disappeared, and controlling the vehicle speed based on the range and range rate of the phantom target.

12. The system of claim 11 wherein, to control the vehicle speed based on the range and range rate of the phantom target, the controller reduces the vehicle speed by generating abrake control signal operative to control a brake actuator.

13. The system of claim 12 wherein reducing the vehicle speed includes reducing the vehicle speed to zero.

14. The system of claim 11 wherein the controller is also for determining whether another sensed target has been acquired, and, if another sensed target has been acquired, controlling the vehicle speed based on a range and range rate associated with the another sensed target.

15. The system of claim 14 wherein, to control the vehicle speed based on the range and range rate associated with the another sensed target, the controller deactivates the adaptive speed control system.

16. The system of claim 15 wherein, to deactivate the adaptive speed control system, the controller generates a braking control signal operative to control a brake actuator to gradually reduce to zero an amount of hydraulic pressure applied by the brake actuator.

17. The system of claim 12 wherein the controller is also for determining whether another sensed target has been acquired, and, if another sensed target has been acquired, controlling the vehicle speed based on a range and range rate associated with the another sensed target.

18. The system of claim 17 wherein, to control the vehicle speed based on the range and range rate associated with the another sensed target, the controller deactivates the adaptive speed control system.

19. The system of claim 18 wherein, to deactivate the adaptive speed control system, the controller generates a braking control signal operative to control a brake actuator to gradually reduce to zero an amount of hydraulic pressure applied by the brake actuator.

20. The system of claim 13 wherein the controller is also for determining whether another sensed target has been acquired, and, if another sensed target has been acquired, controlling the speed of the vehicle based on the range and range rate associated with the another sensed target.

* * * * *